US012457291B2

(12) United States Patent
Gupta et al.

(10) Patent No.: US 12,457,291 B2
(45) Date of Patent: Oct. 28, 2025

(54) SILENT CALLER ID VERIFICATION USING CALLBACK REQUEST

(71) Applicant: PINDROP SECURITY, INC., Atlanta, GA (US)

(72) Inventors: Payas Gupta, Atlanta, GA (US); Terry Nelms, II, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 86 days.

(21) Appl. No.: 17/317,559

(22) Filed: May 11, 2021

(65) Prior Publication Data
US 2021/0281680 A1 Sep. 9, 2021

Related U.S. Application Data

(63) Continuation of application No. 16/287,879, filed on Feb. 27, 2019, now Pat. No. 11,019,203.
(Continued)

(51) Int. Cl.
*H04M 3/436* (2006.01)
*H04M 3/22* (2006.01)
(Continued)

(52) U.S. Cl.
CPC ......... *H04M 3/436* (2013.01); *H04M 3/2281* (2013.01); *H04M 3/42059* (2013.01); *H04M 19/04* (2013.01); *H04M 2203/6045* (2013.01)

(58) Field of Classification Search
CPC .............. H04M 3/436; H04M 3/2281; H04M 3/42059; H04M 19/04; H04M 2203/6045
See application file for complete search history.

(56) References Cited

U.S. PATENT DOCUMENTS 5,949,874 A 9/1999 Mark
6,021,119 A 2/2000 Derks et al.
(Continued)

FOREIGN PATENT DOCUMENTS

WO WO-2018/236625 A1 12/2018

OTHER PUBLICATIONS

Examination Report No. 1 for Australian app. 2020340368 dated Jan. 31, 2023 (4 pages).
(Continued)

*Primary Examiner* — Steven S Kelley
(74) *Attorney, Agent, or Firm* — Foley & Lardner LLP (57) ABSTRACT

Disclosed herein are embodiments of systems, methods, and products comprises an authentication server for caller ID verification. When a caller makes a phone call, the server receives the phone call and verifies whether the phone call is from a registered device associated with the phone number. The server queries the registered device to retrieve one or more current call states via an authentication function on the registered device. The server compares the states and/or state transitions to the observed states and/or state transitions of the phone call. If the registered device states and/or state transitions match the observed phone call states and/or state transitions, the server verifies that the phone call is from the registered device and not some imposter's device. If there is no such match, the server rejects the phone call before the call phone is connected or terminates the phone call after the phone call is connected.

18 Claims, 5 Drawing Sheets

Related U.S. Application Data (60) Provisional application No. 62/640,826, filed on Mar. 9, 2018.

(51) Int. Cl.
*H04M 3/42* (2006.01)
*H04M 19/04* (2006.01)

(56) References Cited

U.S. PATENT DOCUMENTS

| | | | |
|---|---|---|---|
| 8,046,230 B1 | 10/2011 | McIntosh | |
| 8,135,119 B1 | 3/2012 | Zhao et al. | |
| 8,254,541 B2 | 8/2012 | Cai | |
| 8,660,255 B2* | 2/2014 | Theivendran | H04M 3/428 379/212.01 |
| 8,738,442 B1 | 5/2014 | Liu et al. | |
| 8,856,895 B2 | 10/2014 | Perrot | |
| 9,001,985 B2 | 4/2015 | Cox et al. | |
| 9,060,057 B1* | 6/2015 | Danis | H04L 63/083 |
| 9,094,519 B1 | 7/2015 | Shuman et al. | |
| 9,277,049 B1 | 3/2016 | Danis | |
| 9,332,119 B1 | 5/2016 | Danis | |
| 9,338,619 B2 | 5/2016 | Kang | |
| 9,344,892 B1 | 5/2016 | Rodrigues et al. | |
| 9,531,695 B2 | 12/2016 | Koppolu et al. | |
| 9,544,440 B2 | 1/2017 | Deng et al. | |
| 9,549,062 B1 | 1/2017 | Yaung et al. | |
| 9,762,728 B1 | 9/2017 | Cox et al. | |
| 9,781,255 B1 | 10/2017 | Gailloux et al. | |
| 9,800,612 B2 | 10/2017 | Harvey et al. | |
| 9,860,367 B1 | 1/2018 | Jiang et al. | |
| 9,942,766 B1* | 4/2018 | Bonn | H04W 8/26 |
| 10,044,647 B1 | 8/2018 | Karp et al. | |
| 10,142,464 B1 | 11/2018 | Cairns et al. | |
| 10,149,156 B1 | 12/2018 | Tiku et al. | |
| 10,389,874 B1 | 8/2019 | Farnsworth et al. | |
| 10,397,398 B2 | 8/2019 | Gupta | |
| 11,019,203 B2* | 5/2021 | Gupta | H04L 63/0876 |
| 11,258,896 B1 | 2/2022 | Cox et al. | |
| 12,212,709 B2* | 1/2025 | Gupta | H04W 12/69 |
| 2004/0023644 A1 | 2/2004 | Montemer | |
| 2006/0142012 A1 | 6/2006 | Kirchhoff et al. | |
| 2007/0116227 A1* | 5/2007 | Vitenson | H04M 3/4878 379/207.02 |
| 2008/0219177 A1 | 9/2008 | Flynn et al. | |
| 2008/0253376 A1 | 10/2008 | Charzinski | |
| 2009/0080624 A1 | 3/2009 | Small et al. | |
| 2009/0097630 A1 | 4/2009 | Fotta | |
| 2009/0138712 A1 | 5/2009 | Driscoll | |
| 2009/0274143 A1* | 11/2009 | Garg | H04M 3/436 370/352 |
| 2010/0040216 A1 | 2/2010 | Chida | |
| 2011/0183652 A1 | 7/2011 | Eng et al. | |
| 2011/0211572 A1* | 9/2011 | Campion | H04L 12/66 379/142.04 |
| 2011/0250874 A1* | 10/2011 | Shah | H04M 3/42365 455/414.1 |
| 2012/0021751 A1* | 1/2012 | Zhang | H04M 3/42 455/445 |
| 2012/0166185 A1 | 6/2012 | Zirngibl et al. | |
| 2013/0016819 A1* | 1/2013 | Cheethirala | H04M 1/65 379/142.05 |
| 2013/0156170 A1* | 6/2013 | Springer | H04M 3/493 379/88.22 |
| 2014/0241513 A1 | 8/2014 | Springer | |
| 2014/0250512 A1 | 9/2014 | Goldstone et al. | |
| 2014/0335822 A1 | 11/2014 | Jain | |
| 2015/0024712 A1 | 1/2015 | Kang | |
| 2015/0036813 A1 | 2/2015 | Ananthakrishnan et al. | |
| 2015/0057044 A1 | 2/2015 | Altman | |
| 2015/0347725 A1 | 12/2015 | Ben Ari et al. | |
| 2015/0373193 A1 | 12/2015 | Cook | |
| 2016/0050203 A1 | 2/2016 | Hefetz | |
| 2017/0060779 A1 | 3/2017 | Falk | |
| 2017/0163803 A1 | 6/2017 | Russell | |
| 2018/0082689 A1 | 3/2018 | Khoury et al. | |
| 2018/0365400 A1 | 12/2018 | Lopez-Hinojosa et al. | |
| 2020/0008021 A1 | 1/2020 | Polychronidis | |
| 2020/0267224 A1 | 8/2020 | Doane | |
| 2020/0396331 A1 | 12/2020 | Gupta et al. | |
| 2021/0136200 A1 | 5/2021 | Li et al. | |
| 2022/0046126 A1 | 2/2022 | Grabowski et al. | |
| 2023/0362298 A1 | 11/2023 | Kwok et al. | |
| 2024/0098177 A1 | 3/2024 | Edwards et al. | |

OTHER PUBLICATIONS

Android Phone Application to Detect Malicious Cell Phone Spoofing, https://cse.sc.edu/files/Laurie%20Dening.pdf, Apr. 3, 2018, 8 pages.

International Preliminary Report and Patentability and Written Opinion issued in corresponding International Application No. PCT/US2019/021062 dated Jul. 10, 2019.

International Search Report and Written Opinion issued in corresponding International Application No. PCT/US2018/013965 dated May 14, 2018.

International Search Report issued in International Application No. PCT/US2020/048175 dated Dec. 31, 2020.

Jiang et al., "Integrating Internet Telephony Services", Jun. 2002, retrieved on [Oct. 29, 2020]. Retrieved from the Internet <URL: http://cs.uccs.edu/~cs525/sip/IEEEInternetComputing02_IPTelephony.pdf> entire document.

Mustafa et al., You Can Call But You Can't Hide: Detecting Caller ID Spoofing Attacks, https://ieeexplore.ieee.org/document/6903577/, Jun. 26, 2014, 20 pages.

International Search Report and Written Opinion issued in corresponding International Application No. PCT/US2019/021063 dated May 15, 2019, 14 pages.

International Search Report and the Written Opinion issued in corresponding International Application No. PCT/US2019/021062, dated Jul. 10, 2019, 12 pages.

Written Opinion of the International Searching Authority issued in International Application No. PCT/US2020/048175 dated Dec. 31, 2020.

International Preliminary Report on Patentability for PCT/US2020/048175 dated Mar. 10, 2022 (7 pages).

Extended European Search Report on EPO App. 20859570.2 dated Aug. 8, 2023 (8 pages).

Examiner's Requisition dated Mar. 28, 2024 on CA App. 3, 150,456 (4 pages).

U.S. Appl. No. 62/928,222 (filed Oct. 30, 2019) (Year: 2019).

* cited by examiner

SILENT CALLER ID VERIFICATION USING CALLBACK REQUEST

CROSS-REFERENCE TO RELATED APPLICATIONS

This application is a continuation application of U.S. application Ser. No. 16/287,879, filed Feb. 27, 2019, which claims priority to U.S. Provisional Application No. 62/640,826, filed Mar. 9, 2018, which are hereby incorporated by reference in their entirety.

TECHNICAL FIELD

This application relates generally to methods and systems for silent caller identity verification using callback request.

BACKGROUND

As the sophistication of threats that target sensitive data and critical systems grows, the importance of robust security mechanisms becomes even more important. Identity verification is a key requirement to ensure that a request that claims to come from a certain source indeed does come from that source. Caller identification is a service provided by telephone carriers to transmit the phone number and/or the name of a caller to a callee. However, with the convergence of IP (Internet protocol) and telephony, it is easier to spoof caller identification (e.g., caller's number and/or name) without being detected by the callee.

Conventional and existing methods for verifying a user's identifier (ID) may be cumbersome and tedious. For example, some conventional methods use knowledge-based questions to authenticate users. A caller trying to access a service, such as a financial institution, by making a phone call may have to answer some questions regarding private information to confirm the caller's identity. Such conventional methods may be insecure, inefficient, cumbersome, and take too much time to verify the identity of the user. In addition, such conventional methods may require the user to perform various actions that result in negative user experience.

SUMMARY

For the aforementioned reasons, there is a need for an efficient computer-implemented system and method for verifying callers' identities with less burden on the callers. Embodiments disclosed herein attempt to overcome above challenges by providing an efficient way to enhance security while reducing user interaction. Specifically, embodiments disclosed herein describe a silent caller identity verification mechanism. When the callee receives the call from the caller, an authentication server may check with a registered device to verify whether the legitimate user of the registered device has initiated the call or not. Embodiments disclosed herein may utilize the states and/or state transitions of a phone call as observed by the server and the states and/or state transitions of the registered device to verify that the phone call originated from the registered device.

For example, the authentication server may query the registered device to retrieve the current call state via an authentication function on the registered device. The authentication function may be implemented by an authentication application on the registered device, a system utility in the registered device, and/or a service associated with the registered device. The authentication server may compare these states and/or state transitions of the registered device to the observed states and/or state transitions of the phone call. If the registered phone device states and/or state transitions match the observed phone call states and/or state transitions, the authentication server may determine that the phone call is from the registered device of the legitimate caller and not some imposter's device, thereby verifying the caller's identification. The verification process is automatic, seamless, and frictionless. Furthermore, the verification process is effortless from the perspective of the user who simply may have a registered device such as a programmed smartphone, which can monitor and transmit the states and/or state transitions of the registered device to the authentication server.

In an embodiment, a computer-implemented method comprises receiving, by a computer, a phone call and an associated caller identifier; querying, by the computer utilizing the caller identifier, a database to retrieve a device identifier of a device associated with a caller; receiving, by the computer, a state of the device transmitted by the device in response to a request to the device from the computer utilizing the device identifier; and authenticating, by the computer, the phone call in response to the computer determining that a state of the phone call matches the state of the device.

In another embodiment, a system comprises a non-transitory storage medium storing a plurality of computer program instructions; and a processor electrically coupled to the non-transitory storage medium and configured to execute the plurality of computer program instructions to: receive a phone call and an associated caller identifier; query, utilizing the caller identifier, a database to retrieve a device identifier of a device associated with a caller; receive a state of a device transmitted by the device in response to a request from the processor to the device utilizing the device identifier; and authenticate the phone call in response to the processor determining that a state of the phone call matches the state of the device.

In yet another embodiment, a computer-implemented method comprises receiving, by a first device, a phone call and an associated caller identifier; querying, by the first device, a database to retrieve a device identifier of a second device associated with the caller identifier; receiving, by the first device, a state of the second device transmitted by the second device in response to a request from the first device utilizing the device identifier to the second device; and authenticating, by the first device, the phone call in response to the first device determining that a state of the phone call matches the state of the second device.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein provide a silent caller identity verification mechanism by utilizing the states and/or state transitions of a phone call and a device purportedly making the phone. Phone calls (using landline, mobile, voice over Internet protocol, and the like) transition through a set of states that represent the different phases of a phone call. When a device, such as a mobile phone, a smart speaker, voice over Internet protocol (VoIP) software on a computer, and the like, is not making a phone call, it is in an inactive state. Once the phone device initiates a call (e.g., phone number dialed), the state of the caller's phone device transitions to outgoing call started or outgoing call ringing state. When a callee answers the call at the callee's phone device, the state of the caller's phone device changes to outgoing call connected. During the phone call, there may be state transitions such as outgoing call put on hold. In addition, at the end of a call there is a state transition to outgoing call terminated. The specific names of the states are exemplary and are not meant to be limiting of the subject matter presented here.

The state changes (e.g., phases) that are inherent to a phone call may provide information for the process of call identity verification. Embodiments disclosed herein may utilize the states and/or state transitions of the phone call to verify that a specific device is making a given phone call. A state may indicate a state of a phone call or a device (e.g., outgoing call started) at a point in time. A state transition may indicate that at a point in time the phone call or the device has transitioned (or switched) from one state to the other. For instance, a state transition may indicate that at a point in time, the phone call or the device has transitioned from a state of outgoing call started to a state of outgoing call ringing. When a caller makes a phone call to a callee, an authentication server may query a registered device associated with the caller's phone number (or any other identifier) to retrieve the current call state or logs of previous call states via an authentication function on the registered device. The authentication function may be implemented by an authentication application on the registered device, a system utility in the registered device, and/or a service associated with the registered device. The authentication server may compare these states and/or state transitions of the registered device to the observed states and/or state transitions of the phone call. If the registered device states and/or state transitions match the observed phone call states and/or state transitions, the authentication server may determine that the phone call is from the registered device of a legitimate caller and not some imposter's device, thus verifying the caller's identification.

Figure 1A:
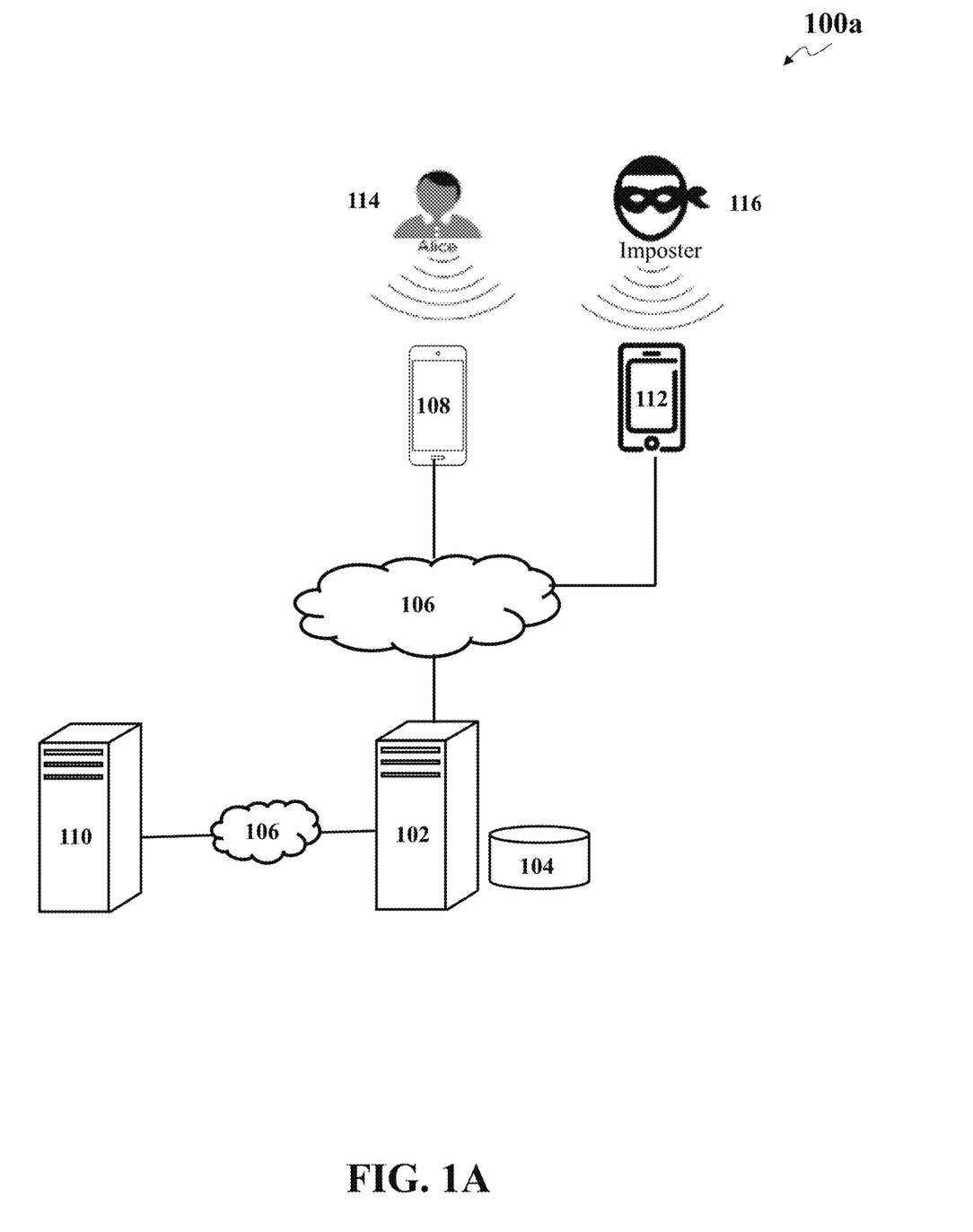
FIG. 1A illustrates a computer system for silent caller identity verification, according to an embodiment.

FIG. 1A illustrates a computer system 100a for silent caller identity verification, according to an embodiment. The system 100a may comprise an authentication server 102, a user database 104, a registered device 108, and a call center server 110 that are connected with each other via hardware and software components of one or more networks 106. Examples of the network 106 include, but are not limited to, Local Area Network (LAN), Wireless Local Area Network (WLAN), Metropolitan Area Network (MAN), Wide Area Network (WAN), and the Internet. The communication over the network 106 may be performed in accordance with various communication protocols, such as Transmission Control Protocol and Internet Protocol (TCP/IP), User Datagram Protocol (UDP), and IEEE communication protocols.

A user 114 (e.g., owner of the registered device 108) may make a phone call to the call center server 110 from the registered device 108. The call center server 110 may be able to determine the phone number of the caller/user 114 through automatic number identification (ANI) service. However, with the convergence of IP and telephony, it may be very easy to spoof caller's phone number and/or name. For example, an imposter 116 may call the call center server 110 from an imposter device 112 spoofing the user's 114 phone number pretending to be the user 114.

The authentication server 102 may be located in between the caller's device (e.g., registered device 108 or the imposter's device 116) and the call center server 110. In some embodiments, the authentication server 102 and the call center server 110 may be combined as a single server. The phone calls aiming to the call center server 110 may first reach the authentication server 102. Upon receiving the phone call, the authentication server 102 may verify that the phone call is indeed from the registered device associated with the phone number, not from some imposter's device before allowing the phone call to be connected with the call center server 110. The authentication server 102 may be any computing device comprising a processor and other computing hardware and software components, configured to process the authentication requests. The authentication server 102 may be logically and physically organized within the same or different devices or structures, and may be distributed across any number of physical structures and locations (e.g., cabinets, rooms, buildings, cities).

The registered device 108 may be any computing device capable of making a phone call and interacting with the authentication server 102. The registered device 108 may also comprise a microphone and an optional speaker to capture and process voice and initiate the phone call. The examples of the registered device 108 may include, but are not limited to, a smartphone, a tablet computer, a smart watch, an IoT (Internet of Things) device, and the like.

The imposter device 112 may be any computing device capable of making a phone call. The imposter 116 may utilize the imposter device 112 to initiate security attack by spoofing the phone number associated with the legitimate user 114. For example, when the imposter 116 makes a phone call to the call center server 110 using the imposter device 112, the call center server may determine that the phone number belongs to the legitimate user 114. The examples of the imposter device 112 may include, but are not limited to, a smartphone, a tablet computer, a smart watch, an IoT device, and the like.

The registered device 108 may be a trusted device that is registered with the authentication server 102. The registered device 108 (e.g., registered smartphone of the user 114) may have an function that may monitor the states and/or state transitions of any outgoing call events on the smartphone, such as inactive, idle, off-hook, outgoing call started (alerting), outgoing call connected, outgoing call terminated, outgoing call put on hold, and the like. The authentication function may be implemented by an authentication application on the registered device 108, a system utility in the registered device 108, and/or a service associated with the registered device 108. The authentication function may transmit the states and/or state transitions to the authentication server 102. The authentication function may require the user 114 to register with the authentication server 102. In the registration process, the user 114 may input the phone number, a registered device identifier (ID), the user's identifier (e.g., name, e-mail address), an account identifier (e.g., an account number), and other related information. The authentication server 102 may extract such registration information and store the information into a database 104. In an embodiment where the authentication function is implemented by an authentication application, the authentication application may automatically register itself with the authentication sever 102 by fetching the phone number from the operating system of the device 108. The authentication application may also fetch the profile information of the user 114 when the user 114 signs in to the application. The authentication application may further fetch personal information of the user 114 from other applications in the device 108 and send the personal information to the authentication server 102. Additionally, the authentication application may fetch the personal information from the contact card of the user 114 and use the personal information to generate a user account or sign into an existing user account. Furthermore, the authentication application may prompt the user 114 to enter various personal details. It should however be understood that the aforementioned registration processes are merely illustrative and other registration processes should also be considered within the scope of this disclosure.

The database 104 may be any non-transitory machine-readable media configured to store the registered users' data. Specifically, the database 104 may comprise the user identifier, the phone number, the registered device identifier, and the like. The database 104 may include any other related data of the users that may be used for authentication. For example, the database 104 may store user identifier (e.g., account number, phone number, e-mail address) in association with the device identifier.

In operation, the authentication server 102 may receive the phone call from the caller's device. The authentication server 102 may verify the caller of the phone call is indeed the registered user associated with the phone number. The authentication server 102 may perform the authentication by comparing the monitored states and/or state transitions of the registered device 108 and the observed states and/or state transitions. Based on the phone number (or any other user identifier, as described below) of the phone call, the authentication server 102 may query the database and determine the registered device ID and associated with the phone number (or any other user identifier). In some embodiments, the authentication server 102 may utilize other forms of identifiers as an alternate to the phone number. For example, the authentication server may utilize an account number entered (e.g., through IVR) by the user 114 while interacting with the call center server 110. As another example, the user 114 may provide an e-mail address to an agent associated with the call center server 110 and/or the authentication server 102. The authentication server 102 may further query/request the registered device 108 associated with the caller's phone number (or any other identifier) for the device state. The communication (e.g., the query/request) from the authentication server 102 to the registered device 108 may be through an Internet Protocol (IP) channel such as APNS (Apple push notification service), GCM (Google cloud messaging), and/or FCM (Firebase Cloud Messaging) message or through a mobile message channel such as SMS (Short Message Service), RCS (Rich Communication Services), and/or Multimedia Messaging Service (MMS). Regardless of the communication channel. The authentication server may request the device state via the authentication function the registered device 108. Because the authentication function is on the registered device 108, the request from the authentication server 102 may reach the legitimate user's registered device 108 and not the attacker's device 112 in the event of an attacker/imposter 116 spoofing the phone number. Upon receiving the request, the registered device 108 may send the current state of the outgoing call (if any) to the authentication server 102 via the authentication function.

The authentication function may, in some embodiments, provide a notification to the user 114 that the authentication server 102 is automatically verifying the identity of the user 114. The notification may be visual such as blinking of the screen of the registered device 108 and/or blinking of LED lights in the registered device 108. Alternatively or additionally, the notification may be haptic or audible (e.g., beep or music).

In some cases, the authentication server 102 may not necessarily receive the phone call from the registered device 108. In these cases, the authentication server 102 may function as a point of contact between the registered device 108 and an enterprise server (e.g., call center server 110). There may be another module that may receive the call and transmits an indication of the call and any other information related thereto to the authentication server 102. The module may be physically part of or otherwise reside in proximity to the call center server 110.

The authentication server 102 may compare the received state with the observed state to determine if there is a match. When the authentication server 102 receives the phone call, the authentication server 102 may observe that there is an outgoing call started or alerting from the device associated with the phone number. Thus, the observed state may be outgoing call started (alerting). If the phone call is indeed from the registered device 108 associated with the phone number, the authentication function on the registered device 108 should monitor the same outgoing call started (alerting) state and send the state to the authentication server 102. If the phone call is not from the registered device 108, which means some imposter 116 try to spoof the phone number by calling from an imposter device 112, the observed state may be the current state of the imposter device 112 and the received state may be the current state of the actual registered device 108. The authentication server may compare the imposter device's 112 state (e.g., observed state) with the actual registered device's 108 state (received from the authentication function). The authentication server 102 may forward the phone call to the callee (e.g., call center) if there is a match. If there is no match, the authentication server 102 may reject the phone call. In some embodiments, the authentication server 102 may delay the phone call made from the registered device 108 to the callee while implementing the various verification operations described throughout this disclosure. Alternatively, the delay may be added by the registered device 108 or the call center server 110.

After the phone call is connected with the call center server 110, the authentication server 102 may query the registered device 108 and receive the registered device's second state. The authentication server 102 may compare the second received state with a second observed state. In this example, the second observed state may be outgoing call connected. If the phone call does originate from the registered device 108, the authentication function may have monitored the state transition into outgoing call connected at the registered device 108 and send the state to the authentication server 102. As a result, the second received state may match the second observed state. The authentication server 102 may keep the phone call connected if there is a match. If there is no match, the authentication server 102 may terminate the phone call. In some embodiments, the authentication server 102 may generate and provide a score indicating a likelihood that the call originated from the registered user device 108 based upon one or more of the aforementioned comparisons. The authentication server 102 may provide the score to the call center server 110.

In addition to verifying that the phone call is from the registered device 108, the authentication server 102 may verify that the user 114 of the registered device 108 (and not anyone else in possession of the registered device 108) is making the call. For example, the authentication function may transmit to the authentication server 102 an indication that the registered device 108 was unlocked using the user's 114 biometric such as fingerprints, retina scan, and/or face scan. The authentication function may alternatively transmit an indication that the registered device 108 was unlocked using the user's 114 personal identification number (PIN) or the user's 114 password. Such indications may allow the authentication server 102 to determine that it is indeed the user 114 of the registered device 108 that is making the phone call.

The call center server 110 may be any computing device configured to receive and transmit a large volume of requests by telephone. Large companies or organizations may use the call center server 110 to managing customer relationships and interactions. For example, the call center server of a bank may receive phone calls from bank customers trying to access various services. In some embodiments, the call center server 110 may be any callee device, including any individual's phone device, such as a smartphone, a tablet computer, a smart watch, and the like. For example, both ends of the call may be mobile devices associated with two individual users.

Figure 1B:
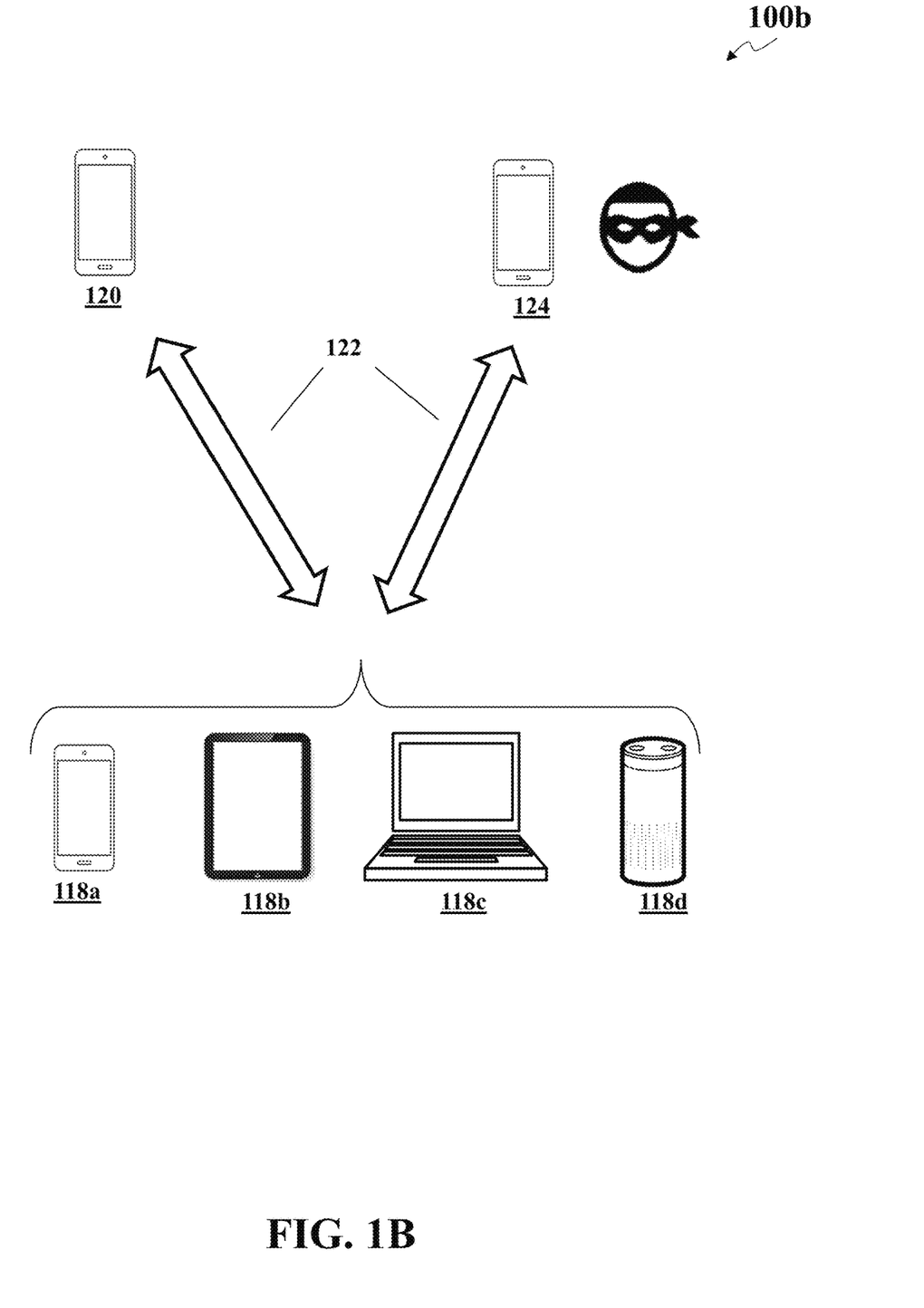
FIG. 1B illustrates a computer system for silent caller identity verification, according to an embodiment.

FIG. 1B illustrates a computer system 100b for silent caller identity verification, according to an embodiment. The system 100b may comprise receiving devices 118a-118d (collectively or commonly referred to as 118), a calling device 120, an imposter device 124, and a communication medium 122. It should be understood that the computer system 100b is merely illustrative, and systems with alternate, additional, and fewer number of components should be considered within the scope of this disclosure.

The receiving devices 118 may be any kind of electronic devices capable of receiving a phone call through any of the telephony and/or IP channels. Non-limiting examples of the receiving devices 118 may include a mobile phone 118a, a tablet computer 118b, a laptop computer 118c, and an IoT device 118d. It should however be understood that the shown receiving devices 118 are merely illustrative and other receiving devices are to be considered within the scope of this disclosure. Each of the receiving devices 118 may have an authentication function. The authentication function may be implemented by an authentication application, a system utility, and/or a service associated with the device 118.

The calling device 120 may be any kind of electronic devices configured to make a phone call through IP and/or telephony channels to the receiving devices 118. Non-limiting examples of the calling device 120 may include a mobile phone, a tablet computer, a laptop computer, a desktop computer, and an IoT device. The calling device 120 may have an authentication function. The authentication function may be implemented by an authentication application in the calling device 120, a system utility in the calling device 120, and/or a service associated with the calling device 120.

The communication medium 122 may include any kind of communication channel, including but not limited to IP channels such as APNS, GCM, and FCM or mobile message channel such as SMS, RCS, and MMS. The authentication function in the calling device 120 may communicate with the authentication functions in the receiving devices 118 through the communication medium 122. However, the imposter device 124 may not have an authentication function and therefore may not be able leverage the communication channel 122 for the authentication functionality described throughout this disclosure. Therefore, the spoofing attacks from the imposter device 124 may be detected by the receiving devices 118.'

In operation, a receiving device 118 may receive a phone call purportedly from a phone number associated the calling device 120. It should be understood that the phone number is only an illustrative form of a calling user (also referred to as a caller) identifier. To verify that the phone call is indeed from the calling device 120, the authentication function in the receiving device 118 may look up a device ID (or any other device identifier) associated with the phone number (or any other caller identifier). Using the device ID, the receiving device 118 may communicate with the calling device 120 to verify that the state of the phone call matches the state of the calling device 120. If the state of the phone call matches the state of the calling device 120, the authentication function in the receiving device 118 may indicate that the phone call is authenticated. If the phone call is from the imposter device 124 using the phone number spoofed from the calling device 120, the state of the phone call may not match the state of the calling device 120. In this case, the authentication function in the receiving device 118 may indicate that the phone call is not authenticated. Alternatively or additionally, the authentication function in the receiving device 118 may generate a score indicating a likelihood of the authenticity of the call and display the score to a user of the receiving device 118.

Figure 2:
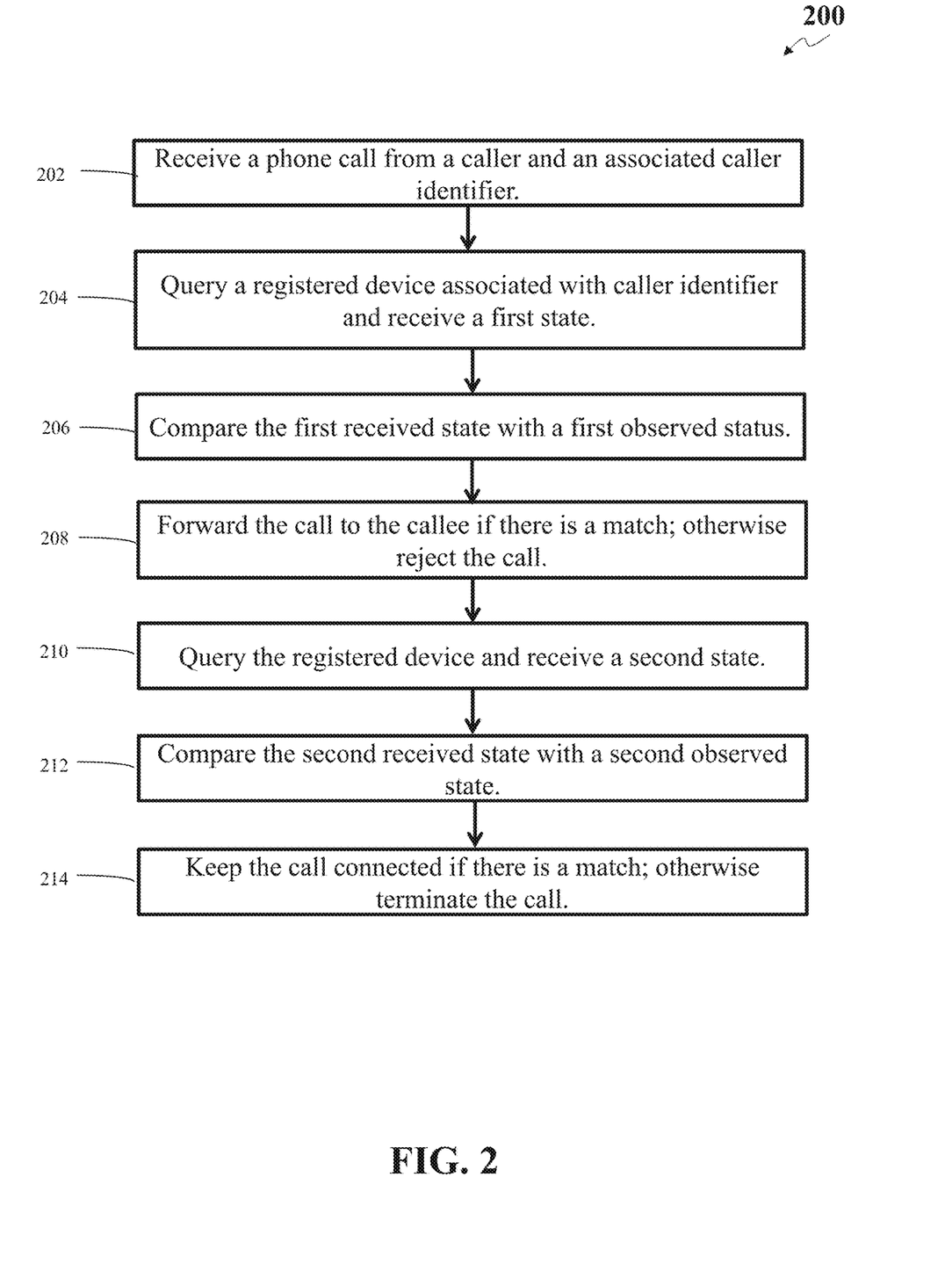
FIG. 2 illustrates a flowchart depicting operational steps for silent caller identity verification, according to an embodiment.

FIG. 2 illustrates execution of a method 200 for silent caller identity verification, according to an embodiment. Other embodiments may comprise additional or alternative steps or may omit some steps altogether. Although multiple computers may perform one or more steps of the method 200, the following describes, for brevity, a single authentication server performing the steps. It should be understood that the method 200 may not be executed by the authentication server but an authentication function in a callee device. Therefore, the use of the authentication server is merely for illustration and should not be considered limiting.

At step 202, the authentication server may receive a phone call from a caller and an associated caller identifier (e.g., a phone number). The caller may make a phone call to a call center, such as an IVR (interactive voice response) server, from the caller's phone device. For instance, the caller may make a phone call to a bank's call center attempting to access a service (e.g., check his/her bank account balance). The call center may be able to see the phone number of the caller through automatic number identification (ANI) service. ANI is a feature of a telecommunications network for automatically determining the origination telephone number. The phone number may be associated with a legitimate caller and a registered device of the caller. For example, a certain phone number may belong to a certain caller and may be associated with the caller's registered device. In some embodiments, the call center server and/or the authentication server may identify the caller because the caller is logged into an account. The login may be within an authentication function and/or another application or function (e.g., a banking application) in a caller's phone.

However, with the convergence of IP and telephony, it may be very easy to spoof caller's phone number and/or name. Thus, the call center may need to verify the caller's identity. For example, the call center may need to verify that the phone call is coming from the legitimate owner/user/caller associated with the phone number, not some imposter.

In some other embodiments, the authentication server may be located between the caller's device and the call center. In some other embodiments, the authentication server and the call center server may be part of one server. All the phone calls aiming to the call center may reach the authentication server first before the phone calls reach the call center. The phone calls may reach the authentication server with protocols such as a SIP (session initial protocol) request, IAM (initial address message), or any other protocol. The authentication server may treat the phone call as an authentication request. In some embodiments, the authentication server may route the phone call to the call center only if the authentication server authenticates the caller's ID.

Upon receiving the phone call, the authentication server may verify that the phone call is indeed from the registered device associated with the phone number, not from some imposter's device. As a result, the authentication server may further determine that the legitimate user of the registered device made the phone call (i.e., a legitimate caller has placed the call), not some imposter.

It should be understood that the phone number is only an example of the caller identifier. The authentication server may receive, fetch, and/or retrieve other forms of caller identifiers. Non-limiting examples of a caller identifier may include an account number and an e-mail address. For example, when the caller calls the call center (or any other destination), the call center computer may prompt the user to provide other forms of caller identifier in addition to or as an alternate to the phone number. The authentication server may then use any one of the aforementioned caller identifiers to retrieve a device identifier (also referred to as device ID) of a registered device associated with the caller identifier.

At step 204, the authentication server may query a registered device associated with the caller identifier (e.g., caller's phone number or any other caller identifier) and receive the registered device's first state. The registered device associated with the caller identifier may have an authentication function that may enable the device to monitor any outgoing call events, such as inactive, idle, off-hook, outgoing call started (alerting), outgoing call connected, outgoing call terminated, outgoing call put on hold, and the like. The authentication function may be implemented by an authentication application on the registered device, a system utility in the registered device, and/or a service associated with the registered device. The authentication function may be continuously running in the background. In some embodiments, the authentication function may start to run when there is an outgoing call initiated. Alternatively, the authentication server may send a request (e.g., a silent push request) to activate the authentication function.

The authentication function on the user's mobile phone may require the user to register with the function. In the registration process, the user may input the phone number, the registered device identifier, the user's identifier (e.g., name) and other related information. The authentication server may extract such registration information and store the information into a database. Furthermore, in the registration process, the user may be able to register multiple devices.

Based on the caller identifier associated with phone call, the authentication server may query the database and determine the registered device ID. It should be understood that the user ID, and the account number are just illustrative caller identifiers and other forms of identifiers should also be considered to be in the scope of this disclosure, as described above. For example, the authentication server may utilize an identifier such as an account number entered by the caller (e.g., through IVR) while interacting with a call center server. As another example of the identifier, the caller may provide an e-mail address to an agent associated with the call center server and/or the authentication server.

In some embodiments, the authentication server may not have an account number or user ID associated with the phone number. In these embodiments, the authentication server may transmit a request to the device where the phone call originated from. Based on the request, the device may prompt the user to enter an identity information such as an account number. After the user provides the identity information such as the account number, the server may query the database to lookup the device (e.g., a device ID) associated with the identity information. The authentication server may then execute the steps below to authenticate as well as enroll the user. To enroll the user, the authentication server may check multiple steps (e.g., disconnected, hold) before the database is updated to link the account number with the device. It should therefore be understood that the steps below describing an authentication process may apply to an enrollment process as well. For enrollment, the device associated with the caller below may not necessarily be registered until the enrollment process is complete.

The authentication server may query/request the registered device (or a non-registered device in the embodiments enrolling the caller) associated with the caller's phone number (or any other caller identifier such as an account number) for the device state. When the user has multiple registered devices associated with the phone number, the authentication server may query each of the multiple registered devices to obtain the device state. The authentication server may request the device state via the authentication function on the registered device. For example, the authentication server may send a request (e.g., silent push request) to the registered device to request the device state via an internet protocol (IP) channel. The request may through an IP channel such as APNS (Apple push notification service), GCM (Google cloud messaging), and/or FCM (Firebase Cloud Messaging). Alternatively or additionally, the request may be through a mobile message channel such as SMS (Short Message Service), RCS (Rich Communication Services), and/or Multimedia Messaging Service (MMS). The request may enable the authentication server to communicate with the authentication function without drawing attention from the user. Because the authentication function is on the registered device associated with the phone number (or any other caller identifier), the request from the authentication server may reach the legitimate user's registered device and not the attacker's device in the event of an attacker spoofing the phone number. Upon receiving the request, the registered device may send the current state of the outgoing call (if any) to the authentication server via the authentication function. The communication from the registered device to the authentication server may through the IP channel such as APNS, FCM, and/or GCM or through a mobile message channel such as SMS, RCS, and/or MMS. The mobile message channel may be used by one or more of the authentication server and the registered device when there is low or intermittent Internet connectivity. In some embodiments, the authentication function may automatically recognize the state and send the state to the authentication server without the request (e.g., push request) from the authentication server.

At step 206, the authentication server may compare the first received state with the first observed state to determine if there is a match. In this example, the first observed state may be outgoing call started (alerting). Specifically, the authentication server observes that there is an outgoing call started or alerting from the device associated with the phone number (or any other caller identifier). If the phone call is indeed from the registered device associated with the phone number (or any other caller identifier), the authentication function on the registered device should monitor the same outgoing call started (alerting) state and send the state to the authentication server. For example, the authentication function may send a response comprising a time stamp and the state. As a result, the authentication server's observed state should match the received state. If the phone call is not from the registered device because an imposter is trying to spoof the phone number by calling from an imposter device, then the first observed state may be the current state of the imposter device. The first received state may be the current state of the actual registered device. The authentication server may compare the imposter device's state (e.g., observed state) with the actual registered device's state (received from the authentication function).

At step 208, the authentication server may forward the phone call to the callee (e.g., call center) if there is a match or reject the phone call if there is no match. For example, if the received state from the registered device is positive (e.g., yes, there is an outgoing call from the device to the call center), which matches the first observed state, the authentication server may determine that it is more likely that the phone call is indeed from the registered device, not some imposter. As a result, the authentication server may allow the phone call to be forwarded to the call center (e.g., an interactive voice response (IVR) server).

In some embodiments, the authentication server request may be in the promiscuous mode. For example, the call center may connect the phone call before the authentication and the authentication server can verify the caller's ID after the connection and alert the call center later on.

When the first observed state does not match the first received state, the authentication server may determine that the phone call is not from the registered device. For example, in the event the response from the authentication function is negative (e.g., no, there is no outgoing call), the authentication server may simply reject the call. In some embodiments, the authentication server may delay the phone call made from the registered device to the while implementing the various verification operations described throughout this disclosure.

At step 210, the authentication server may query the registered device and receive the registered device's second state after the phone call is connected. After the authentication server forwards the phone call to the call center, the call center may connect the phone call (e.g., an employee at the call center picked up the phone call). As a result, there is a state transition of the phone call. For example, the observed phone call state may transmit from outgoing call started (alerting) to outgoing call connected. The authentication server may send another request to the authentication function to get the new state of the outgoing call at the registered device. Upon receiving the request, the registered device may send the current state of the outgoing call to the authentication server via the authentication function. For example, the authentication function may send a response comprising a time stamp and the current state.

At step 212, the authentication server may compare the second received state with a second observed state. In this example, the second observed state may be outgoing call connected. After the authentication server forwards the phone call to the call center in step 208, the authentication server may be able to see the phone calls connected state when the call center answers the phone call. For example, the authentication server may communicate with the call center server for the new state. Alternatively, the authentication server may be able to observe the connected state because the authentication server and the call center server are part of one same server. If the phone call does originate from the registered device, the authentication function may have monitored the state transition into outgoing call connected at the registered device and send the state to the authentication server. As a result, the second received state should match the second observed state.

If the phone call is not from the registered device, which means the authentication server forwarded the phone call to the call center in step 208 out of the coincidence that when the imposter device is calling the call center, the registered device is making a phone call too. In this case, the connected phone call is from the imposter device. The second observed state is that outgoing call connected. The second observed state may be the current state of the imposter device and the second received state may be the current state of the actual registered device. The authentication server may compare the imposter device's state (e.g., observed state) with the actual registered device's state (received from the authentication function).

At step 214, the authentication server may keep the phone call connected if there is a match or terminate the phone call if there is no match. Specifically, if the second received state matches the second observed state, the authentication server may determine that it is more likely that the phone call is indeed from the registered device, not some imposter, thus verifying the caller's ID. As a result, the authentication server may continue allowing the phone call to be connected. If the second received state does not match the second observed state, the authentication server may determine that the phone call is not from the registered device and may terminate the call.

By comparing the second received state and the second observed state, the authentication server may be able to exclude the scenario that the authentication server forwarded the phone call from an imposter to the call center in step 208 out of the coincidence. It may be possible that when the imposter device is calling the call center, the registered device is making a phone call too. However, it is unlikely that when the imposter device phone call is connected, the registered device phone call is connected too at the exact same time. The authentication function on the registered device may monitor a state that is not outgoing call connected. As a result, the second received state will not match the second observed state. The authentication server may determine the connected phone call is from an imposter and terminate the phone call.

Although the imposter device passed through the first state checking in step 208, it is less likely that the imposter device will pass through the second state check. Therefore, by monitoring the state transitions of a phone call, the authentication server may be able to accurately detect imposter phone call.

In some embodiment, the authentication server may query third, fourth, fifth, etc., state from the registered device during the call and continuously check if the observed state of a phone call matches the registered device state. For example, the authentication server may periodically query the state from the registered device and compare the received state with the observed state. Alternatively, the authentication function may send the state whenever there is a state change. The authentication server may perform state comparison after receiving the new state. In this way, the authentication and verification may be more robust. The authentication server may identify mismatch even if the imposter device passes through the first several rounds of checking. The authentication server may provide weak authentication to strong authentication based on how many states are checked. The strength of the authentication may increase with the number of state checks.

In addition to verifying that the phone call is from the registered device, the authentication server may verify that the user of the registered device (and not anyone else in possession of the registered device) is making the call. For example, the authentication function may transmit to the authentication server an indication that the registered device was unlocked using the user's biometric such as fingerprints, retina scan, and/or face scan. The authentication function may alternatively transmit an indication that the registered device was unlocked using the user's personal identification number (PIN) or the user's password. Such indications may allow the authentication server to determine that it is indeed the user of the registered device that is making the phone call.

The verification process is automatic, seamless and frictionless. Furthermore, the verification process is effortless from the perspective of the user who simply must have a registered device such as a programmed smartphone, which can monitor and transmit the states and/or state transitions and/or any other information of the registered device to the authentication server.

It should also be understood that the authentication server performing the various steps of the method 200 is merely illustrative. In some embodiments, the aforementioned steps may be performed at a callee device such as a mobile phone. For example, a first mobile phone may receive a phone call from a phone number associated with a second mobile phone. An authentication function in the first mobile phone may perform one or more of the aforementioned steps to verify the phone call indeed came from the second mobile phone.

Figure 3:
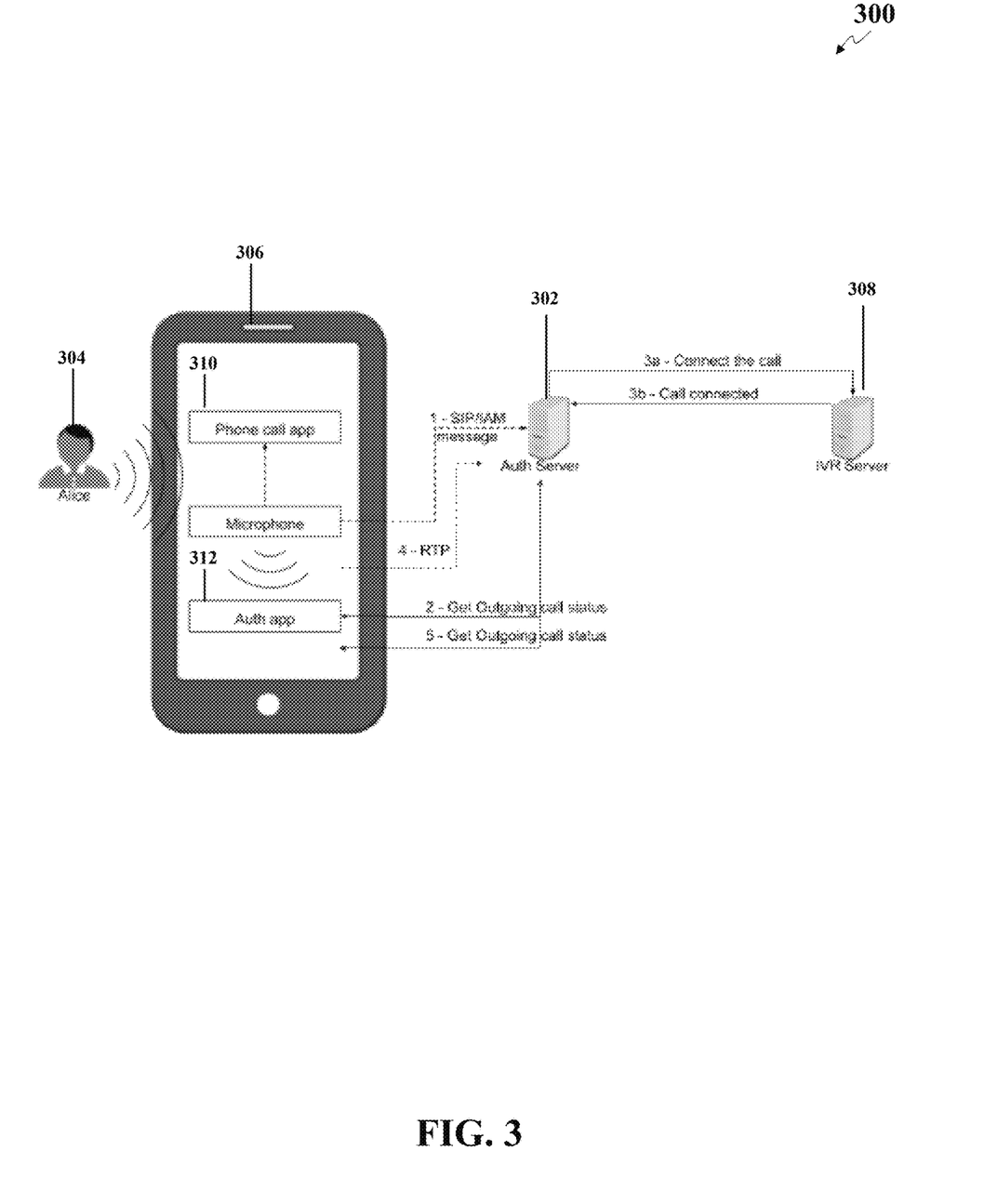
FIG. 3 illustrates an example of silent caller identity verification over a phone call to a call center, according to an embodiment.

FIG. 3 illustrates an example 300 of silent caller identity verification over a phone call to a call center, according to an embodiment. The authentication server 302 may authenticate a caller 304 by verifying the caller's ID while the caller ("Alice") 304 is making a phone call to a call center server, such as an IVR (interactive voice response) server 308. The authentication server 302 may be located between the caller 304 and the VR server 308. Any phone calls aiming to the IVR server 308 may reach the authentication server 302 first. In some embodiments, the authentication server 302 and the IVR server 308 may be combined as one single server. In this example, caller Alice 304 may be the legitimate user using her registered mobile phone 306 to dial the phone number of a call center using a phone call app 310. The phone call may reach the authentication server 302 with a SIP Request or IAM message in step 1. The authentication server 302 may receive the phone call and query the registered device associated with the phone number of the call to retrieve the registered device's first state in step 2. Specifically, the authentication server 302 may send a request to the authentication function 312 on the registered device 306. The communication between the authentication server 302 (e.g., for sending the push request and receiving a response thereto) and the registered device 302 may be through IP channels such as APNS, GCM, and/or FCM. Alternatively or additionally, the communication between the authentication server 302 and the mobile device 306 may be through mobile message channel such as SMS, RCS, and/or MMS. The mobile message channel may be used when there is low or intermittent Internet connectivity between the authentication server 302 and the mobile device 306. The authentication function 312 may be implemented by an authentication application on the registered device 306, a system utility in the registered device 306, and/or a service associated with the registered device 306. The authentication function 312 may monitor the first state as outgoing call started/alerting and send the state with a timestamp (e.g., call-arrival timestamp) to the authentication server 302. The first state observed at the authentication server 302 may be the same outgoing call started/alerting. Because there is a match, the authentication server 302 may forward the call to the IVR server and allow the call to connect with the IVR server 308 in step 3a. After the IVR server 308 connects with the call, the authentication server 302 may observe the call state transition into a second state connected in step 3b. In the meantime, the call from the mobile phone 306 reaches the authentication server 302 with RTP (real-time transport protocol) in step 4. After the call is connected, the authentication server 302 may further query the registered device and receive the registered device's second state with another timestamp (e.g., call-connected timestamp) in step 5. The call state should have changed from started/alerting to connected at the registered device. The authentication server 302 may keep the call connected when the received second state is connected which matches the observed second state.

The two states of phone call at two different time points may be attached with their respective timestamps, such as call-arrival timestamp and call-connected timestamp. Based on the timestamps and states, the authentication server 302 may make a decision on whether the phone call originated from the registered device or not with high accuracy. In some embodiments, the authentication server 302 may delay the phone call made from the registered device 306 to the IVR server 308 while implementing the various verification operations described throughout this disclosure.

In some embodiments, step 2 and step 5 may be combined. The authentication function 312 on the mobile phone

306 may maintain the state of the most recent outgoing call placed from the device 306. Once the call is connected, the authentication server 302 may send a request to obtain the states of the call along with the timestamp. The authentication server 302 may correlate the timestamp of when the call was received (e.g., SIP/IAM in step 1) and when the call was connected (RTP data in step 4). The authentication server 302 may use the two fields (e.g., timestamp, state) to verify that the call did originate from the registered device.

The authentication function 312 may, in some embodiments, provide a notification to the user 304 that the authentication server 304 (and/or the IVR server) 308 is automatically verifying the identity of the user. The notification may be visual such as blinking of the screen of the registered device 306 and/or blinking of LED lights in the registered device 306. Alternatively or additionally, the notification may be haptic or audible (e.g., beep or music).

In some other embodiments, the authentication server may retrieve various other states of the call from the registered device without explicitly asking the user/caller to click or perform any action during the live call. For example, the authentication server may check whether the IVR server has put the registered device on hold or not. When the IVR disconnects the call, the authentication server may check the state of the registered device to verify that the call was terminated. By checking various states, the authentication server may be able to make more robust and accurate decisions.

In some other embodiments, assuming that both ends of the call are mobile devices and user A makes a call to user B. Both devices are equipped with some form of the mobile authentication app. When user A makes a call to user B, user B device may perform the operations of authentication and act as the authentication server.

In some other embodiments, the authentication server may send an SMS message in step 2 rather than sending an APNS/GCM/FCM request to the registered device as described above. This is particularly useful when the registered device has no Internet connection or on a limited Internet connection plan. Alternatively, the authentication server may send a RCS message in step 2. RCS is a communication protocol between mobile-telephone carriers and between phone and carrier, aiming at replacing SMS messages with a text-message system that is richer, provides phonebook polling (for service discovery), and transmit in-call multimedia.

Figure 4:
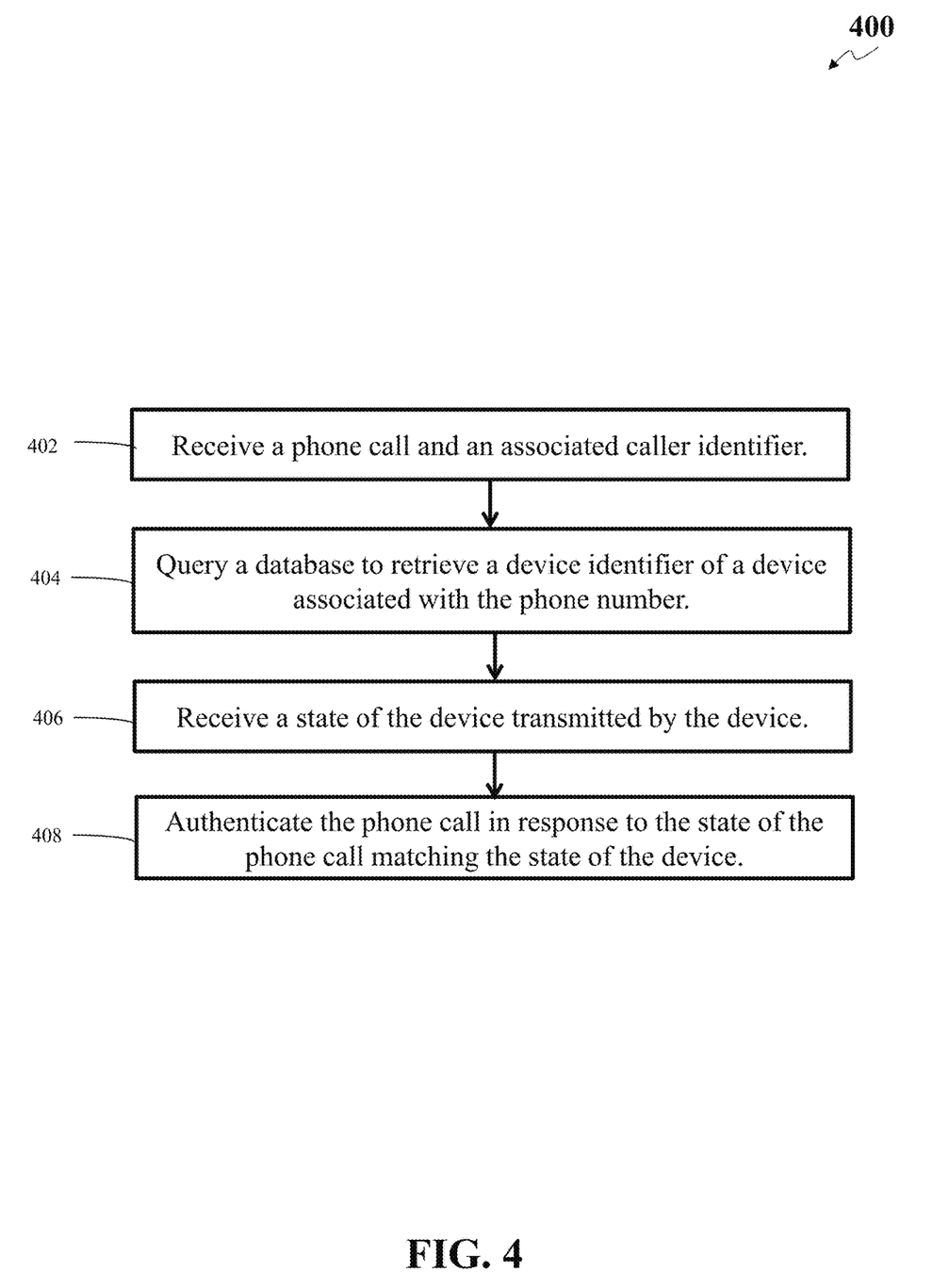
FIG. 4 illustrates a flowchart depicting operational steps for authenticating a phone call, according to an embodiment.

FIG. 4 illustrates a flowchart 400 depicting operational steps for authenticating a phone call, according to an embodiment. Other embodiments may comprise additional or alternative steps, or may omit some steps altogether.

In step 402, the authentication server may receive a phone call and an associated caller identifier. A caller may make a phone call to a call center, such as an IVR (interactive voice response) server, from the caller's phone device. The phone call may reach the authentication server first before reaching the call center. The authentication server may be able to see the phone number (an illustrative caller identifier) of the caller through automatic number identification (ANI) service. Other forms of caller identifier may include the caller's account number and the caller's e-mail address. The caller may provide this information to the call center server or the authentication server.

At step 404, the authentication server may query a database to retrieve a device identifier (also referred to as device ID) of a device associated with caller identifier. As discussed above, the legitimate user associated with a phone number (or any other caller identifier) may register with the authentication function. In the registration process, the user may input the phone number, the registered device identifier, the user's identifier (e.g., name) and other related information. The authentication server may extract such registration information and store the information into a database. Based on the caller identifier associated with the phone call, the authentication server may query the database to retrieve the registered device ID associated with the phone number.

At step 406, the authentication server may receive a state of the device transmitted by the device. The authentication server may query the registered device based on the device ID for the device state. The authentication server may request the device state via the authentication app installed on the registered device. For example, the authentication server may send a request to the registered device. Upon receiving the request, the registered device may send the current state of the outgoing call (if any) to the authentication server via the authentication function.

At step 408, the authentication server may authenticate the phone call in response to the state of the phone call matching the state of the device. The authentication server may compare the received state of the device with the state of the phone call observed by itself. If there is a match, the authentication server may determine that that it is highly possible that the phone call is indeed from the registered device, not some imposter, thus authenticate the phone call. For example, the authentication server may forward the phone call to the call center server. Alternatively, if the phone call is already connected, the authentication server may keep the phone call connected. If the state of the phone call (observed by the authentication server) does not match the state of the device (received from the registered device), the authentication server may reject or terminate the phone call.

It should also be understood that the authentication server performing the various steps of the method 400 is merely illustrative. In some embodiments, the aforementioned steps may be performed at a callee device such as a mobile phone. For example, a first mobile phone may receive a phone call from a phone number associated with a second mobile phone. An authentication function in the first mobile phone may perform one or more of the aforementioned steps to verify the phone call indeed came from the second mobile phone.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method comprising:
receiving, by a computer, from a caller device associated with a call, device state information of the caller device, the device state information received from an authentication application of the caller device in response to a request for the device state information;
identifying, by the computer, based upon the device state information of the caller device, a device state transition from a first state to a second state during the call, and based upon call state information obtained from an interactive voice response (IVR) server, a call state transition from a first call state to a second call state during the call;
receiving, by the computer, authentication information including biometric data of a caller of the call; and
determining, by the computer, whether the biometric data of the caller is authenticated and whether a first timestamp of the device state transition matches a second timestamp of the call state transition of the call obtained from the IVR server;
if the computer determines the biometric data of the caller is authenticated and the first timestamp of the device state transition matches the second timestamp of the call state transition of the call obtained from the IVR server, forwarding, by the computer, the call to a called device associated with the call; and
if the computer determines the biometric data of the caller is not authenticated or the first timestamp of the device state transition does not match the second timestamp of the call state transition of the call obtained from the IVR server, not forwarding, by the computer, the call to the called device associated with the call.

2. The method according to claim 1, further comprising:
receiving, by the computer, a caller identifier for a caller associated with the call;
identifying, by the computer, in a database a device identifier of the caller device by querying the database using the caller identifier; and
transmitting, by the computer, the request for the device state information to the caller device using the device identifier.

3. The method according to claim 2, wherein the caller identifier is at least one of a phone number, an account number, and an e-mail address.

4. The method according to claim 2, wherein the computer transmits the request to an authentication function of the caller device for the device state information.

5. The method according to claim 2, wherein the request is transmitted via at least one of an internet protocol channel and a mobile message channel.

6. The method according to claim 1, wherein a first device state or second device state of the caller device is at least one of inactive, idle, off-hook, outgoing call started, outgoing call ringing, outgoing call connected, outgoing call put on hold, and outgoing call terminated.

7. The method according to claim 1, wherein the authentication information includes an indicator of a type of authentication and authentication data used to authenticate the caller at the caller device, and
wherein the computer further authenticates the caller device using the the type of authentication including the biometric data and at least one of a personal identification number (PIN) and a password.

8. The method according to claim 1, further comprising:
receiving, by the computer, from the caller device, second device state information;
identifying, by the computer, based upon the second device state information of the caller device, a second device state transition from a third state to a fourth state during the call; and
further authenticating, by the computer, the caller device in response to the computer determining that the second device state transition matches a second call state transition of the call.

9. The method according to claim 1, wherein the computer periodically transmits to the caller device a new request for new device state information, receives the new device state information indicating a new device state transition, and further authenticates the caller device based upon the new device state transition and a new call state transition.

10. A system comprising:
a non-transitory storage medium storing computer-executable program instructions; and
a computer coupled to the non-transitory storage medium and configured to execute the plurality of computer program instructions to:
receive from a caller device associated with a call, device state information of the caller device, the device state information received from an authentication application of the caller device in response to a request for the device state information;
identify, based upon the device state information of the caller device, a device state transition from a first state to a second state during the call, and based upon call state information obtained from an interactive voice response (IVR) server, a call state transition from a first call state to a second call state during the call;
receive authentication information including biometric data of a caller of the call; and
determine whether the biometric data of the caller is authenticated and whether a first timestamp of the device state transition matches a second timestamp of the call state transition of the call obtained from the IVR server;
if the computer determines the biometric data of the caller is authenticated and the first timestamp of the device state transition matches a second timestamp of the call state transition of the call obtained from the IVR server, forward the call to a called device associated with the call; and
if the computer determines the biometric data of the caller is not authenticated or the first timestamp of the device state transition does not match the second timestamp of the call state transition of the call obtained from the IVR server, not forward the call to the called device associated with the call.

11. The system according to claim 10, wherein the computer is further configured to:
receive a caller identifier for a caller associated with the call;
identify in a database a device identifier of the caller device by querying the database using the caller identifier; and
transmit the request for the device state information to the caller device using the device identifier.

12. The system according to claim 11, wherein the caller identifier is at least one of a phone number, an account number, and an e-mail address.

13. The system according to claim 11, wherein the computer transmits the request to an authentication function of the caller device for the device state information.

14. The system according to claim 11, wherein the request is transmitted via at least one of an internet protocol channel and a mobile message channel.

15. The system according to claim 10, wherein a first device state or second device state of the caller device is at least one of inactive, idle, off-hook, outgoing call started, outgoing call ringing, outgoing call connected, outgoing call put on hold, and outgoing call terminated.

16. The system according to claim 10, wherein the authentication information includes an indicator of a type of authentication and authentication data used to authenticate the caller at the caller device, and
wherein the computer further authenticates the caller device using the type of authentication including the biometric data and at least one a personal identification number (PIN) and a password.

17. The system according to claim 10, wherein the computer is further configured to:
receive from the caller device, second device state information;
identify based upon the second device state information of the caller device, a second device state transition from a third state to a fourth state during the call; and
further authenticate the caller device in response to the computer determining that the second device state transition matches a second call state transition of the call.

18. The system according to claim 10, wherein the computer periodically transmits to the caller device a new request for new device state information, receives the new device state information indicating a new device state transition, and further authenticates the caller device based upon the new device state transition and a new call state transition.

* * * * *